April 14, 1970   D. E. GRAHAM   3,506,899
SPEED CONTROL SYSTEM FOR ALTERNATING CURRENT INDUCTION MOTORS
Filed April 19, 1968

INVENTOR.
Donald E. Graham
BY
Richard G. Stahr
ATTORNEY

United States Patent Office 3,506,899
Patented Apr. 14, 1970

3,506,899
SPEED CONTROL SYSTEM FOR ALTERNATING CURRENT INDUCTION MOTORS
Donald E. Graham, Dayton, Ohio, assignor to General Motors Corporation, Detroit, Mich., a corporation of Delaware
Filed Apr. 19, 1968, Ser. No. 722,637
Int. Cl. H02p 7/62
U.S. Cl. 318—227                              5 Claims

ABSTRACT OF THE DISCLOSURE

A speed control system for alternating current electric motors wherein two potentiometers, one of which has a movable contact adapted to be operated by changes of an external condition to which the speed of the motor is to be adjusted, are connected in parallel across a source of direct current potential. The base electrode and one current carrying electrode of a transistor are connected across the movable contacts of the potentiometers and the series combination of the current carrying electrodes of the transistor and a capacitor are connected across a direct current potential source. The base electrodes of a unijunction transistor are connected across a reference potential source, which is obtained by rectifying a selected phase of the alternating current supply potential, through respective base resistors and the emitter electrode thereof is connected to a junction between the capacitor and the transistor. The discharge of the capacitor through the emitter and one of the base electrodes of the unijunction transistor produces a trigger signal across one of the base resistors. Successive monostable multivibrator circuits, each responsive to the next preceding trigger signal, produce successive trigger signals spaced from each other by an electrical angle equal to the electrical angle between phases of the supply potential.

The present invention relates to motor speed control systems and, more specifically, to an improvement upon a speed control system for alternating current induction motors.

Alternating current induction motors have discrete phase windings corresponding to each phase of a compatible alternating current supply potential which are energized by the phase of the alternating current supply potential to which they correspond. The number of coils per phase winding may vary depending upon the number of poles designed into the motor. Motors of this type normally operate at a constant, fixed speed which is determined by the frequency of the alternating current supply potential and the number of magnetic poles produced by the phase windings and, to some extent, the load upon the motor.

It has been found that the speed of alternating current induction motors may be smoothly adjusted over a wide range by controlling the electrical conduction angle during which each potential half cycle of each phase of the alternating current supply potential energizes the corresponding phase windings. To reduce the speed, the respective phase windings are energized over a shorter electrical conduction angle of each potential half cycle of the corresponding phase. For optimum operation at any speed, the conduction angle of the potential cycle of all phases should be equal to the conduction angle of the potential cycles of one of the phases selected to be the reference phase.

In another United States patent application Ser. No. 493,652, filed Oct. 7, 1965, now Patent No. 3,387,196 and assigned to the same assignee as that of the present application, a novel speed control system which may be used with any alternating current induction motor of the type having discrete phase windings corresponding to each phase of a compatible alternating current supply potential is disclosed in detail. Briefly, the speed control system so disclosed is responsive to a difference of potential between a reference potential and a control potential, which is not only a function of motor speed but is also independently variable to vary the speed of the motor, to produce an electrical trigger signal at the electrical angle of each potential half cycle of each phase of the alternating current supply potential as determined by the selected motor speed for operating respective trigger signal responsive switching devices which establish respective phase winding energizing circuits when operated to close by the trigger signals.

It is an object of this invention to provide an improved version of the motor speed control system disclosed in the former United States patent application hereinabove identified.

It is another object of this invention to provide an improved motor speed control system which is responsive to changes of an external condition to which the speed of the motor is to be adjusted to automatically maintain the desired controlled parameters.

In accordance with this invention, a motor speed control circuit is provided wherein an electrical trigger signal is produced at the electrical angle of each potential half cycle of each phase of the alternating current supply potential as determined by a difference potential appearing across an impedance bridge circuit having in one leg thereof a variable impedance element for operating respective trigger signal responsive controllable switching circuit devices which establish respective phase winding energizing circuits.

For a better understanding of the present invention, together with additional objects, advantages and features thereof, reference is made to the following description and accompanying drawings in which.

The novel speed control system of this invention may be employed with any alternating current induction motor of the type having discrete phase windings corresponding to each phase of a compatible alternating current supply potential, in a manner which will be brought out in this specification.

For purposes of illustrating the novel features of this invention and without intention or inference of a limitation thereto, the folowing detailed description will be in regard to both Y and delta connected three phase alternating current induction motors.

To establish an energizing circuit for each motor phase winding across the corresponding phase of the alternating current supply potential, respective controllable switching circuit devices responsive to electrical trigger signals are provided.

Figure 2:
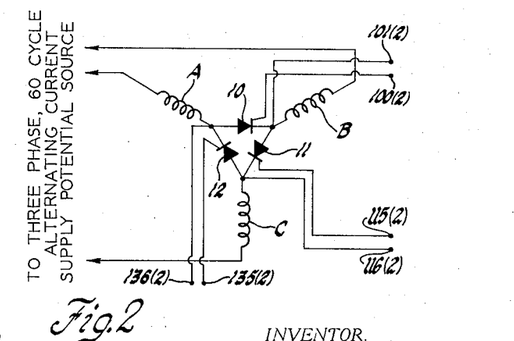
FIGURE 2 is a schematic diagram of a switching system for a Y connected alternating current induction motor which may be used with the circuitry schematically set forth in FIGURE 1.
Figure 3:
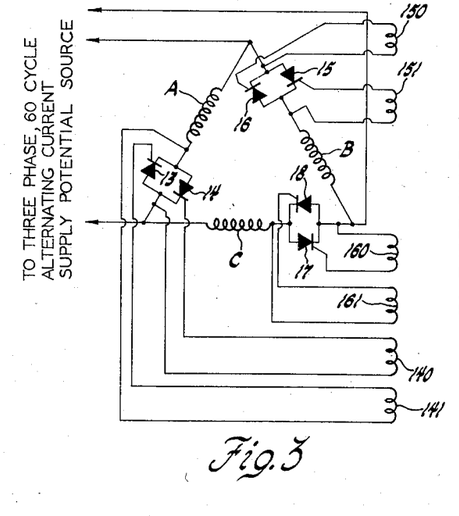
FIGURE 3 is a schematic diagram of a switching system for a delta connected alternating current induction motor which may be used with the circuitry schematically set forth in FIGURE 1.

In FIGURE 2 of the drawing, which is a schematic diagram of a switching system wherein the phase windings of an alternating current induction motor are connected in a Y configuration, and in FIGURE 3 of the drawing, which is a schematic diagram of a switching system wherein the phase windings of an alternating current induction motor are connected in a delta configuration, the trigger signal responsive controllable switching circuit devices are illustrated as silicon controlled rectifiers. It is to be specifically understood that the phase windings labeled A, B and C in FIGURES 2 and 3 are not to be construed as single coils but as all coils of each respective phase winding.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control potential signal of a polarity which is positive with respect to the potential present upon the cathode electrode and of sufficient magnitude to produce control electrode-cathode, or gate, current. In the conducting state, the silicon controlled rectifier will conduct current in one direction and retains the ability to block current flow in the opposite direction.

In FIGURE 2, silicon controlled rectifier 10 corresponds to phase A and, when conducting, completes an energizing circuit for the phase windings corresponding to phase A through the phase windings corresponding to phase B. Silicon controlled rectifier 11 corresponds to phase B and, when conducting, completes an energizing circuit for the phase windings corresponding to phase B through the phase windings corresponding to phase C. Silicon controlled rectifier 12 corresponds to phase C and, when conducting, completes an energizing circuit for the phase windings corresponding to phase C through the phase windings corresponding to phase A. With both silicon controlled rectifiers 10 and 11 conducting, phase A may feed both phases B and C, with both silicon controlled rectifiers 11 and 12 conducting, phase B may feed both phases C and A and with both silicon controlled rectifiers 12 and 10 conducting, phase C may feed both phases A and B.

In FIGURE 3, the parallel combination of oppositely poled silicon controlled rectifiers 13 and 14 correspond to phase A and are connected in series with the phase winding corresponding to phase A, the parallel combination of oppositely poled silicon controlled rectifiers 15 and 16 correspond to phase B and are connected in series with phase winding corresponding to phase B and the parallel combination of oppositely poled silicon controlled rectifiers 17 and 18 correspond to phase C and are connected in series with the phase winding corresponding to phase C.

With single and two phase applications, one and two switching devices, respectively, are required. With applications of more than three phases, one or two switching devices corresponding to each phase may be required depending upon the configuration in which the phase windings are connected.

Figure 1:
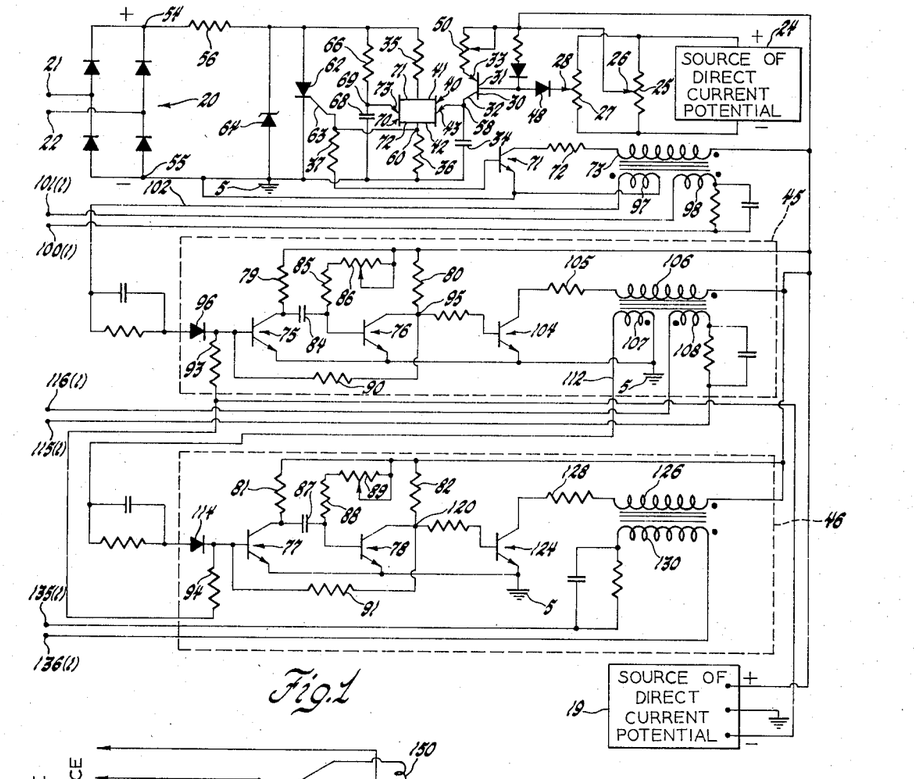
FIGURE 1 is a schematic diagram of one embodiment of the improved speed control system of this invention.

Referring to FIGURE 1, the novel speed control system of this invention is schematically set forth.

As the point of reference or ground potential is the same point electrically throughout the system, it has been illustrated by the accepted symbol and referenced by the numeral 5 in FIGURE 1 of the drawing.

To produce a reference potential in synchronism with a selected phase of the supply potential, a full-wave diode bridge rectifier circuit, generally shown by reference numeral 20, having two alternating current input circuit terminals 21 and 22 may be employed. A selected one phase of the alternating current supply potential may be connected across input terminals 21 and 22 of full-wave diode bridge 20 which produces a pulsating direct current reference potential. Diode bridge 20, therefore, will hereinafter be referred to as the source of reference potential. The phase of the alternating current supply potential with which the reference potential is synchronized will hereinafter be referred to as the reference phase.

It is to be specifically understood that this rectifier circuit may be of any configuration well known in the art and that the selected phase may be half-wave rectified to produce the required reference potential for Y connected motors only. With single phase applications, the reference phase is, of course, the only phase of the supply potential.

A separate source of direct current potential which may be any conventional source well known in the art, has been shown in FIGURE 1 in block form in the interest of reducing drawing complexity and is referenced by the numeral 24.

With the unique motor speed control system of this invention, motor speed may be manually varied or automatically varied in response to changes of an external condition to which the speed of the motor is to be adjusted.

To produce a difference potential, the magnitude of which determines the electrical angle during each potential half cycle of each phase of the alternating current supply potential at which the trigger signals are to be produced and, consequently, the speed of the motor, an electrical impedance bridge circuit having input and output circuitry may be employed.

With the automatic motor speed control feature, the input circuitry of an electrical impedance bridge circuit, including in at least one leg thereof an impedance element which is variable in response to the change of the condition to which the speed of the motor is to be adjusted, is connected across the separate source of direct current potential 24.

For example, the variable impedance element in at least one leg of the bridge may be a temperature, a pressure or an electrical sensitive device which is responsive to changes of external temperature, pressure or electrical conditions, respectively, to change its impedance value.

It is to be specifically understood that these examples are inclusive but not exhaustive of the external conditions to which the automatic motor speed control feature may be responsive.

For manual motor speed control, the input circuitry of an electrical impedance bridge circuit including a manually adjustable impedance element is connected across separate direct current potential source 24.

For purposes of illustrating the novel features of the motor speed control system of this invention and without intention or inference of a limitation thereto, an electrical impedance bridge circuit which provides for automatic or manual motor speed control has been shown in FIGURE 1 and includes a potentiometer 25, having a movable contact 26, and a control potentiometer 27, having a movable contact 28, connected in parallel across separate direct current potential source 24. The output circuitry of this impedance bridge circuit is, of course, the movable contacts 26 and 28 of respective potentiometers 25 and 27.

Control potentiometer 27 may be a conventional potentiometer having a manually operable movable contact, for manual motor speed control, or it may be an impedance element which is variable in response to an external force such as a potentiometer adapted to have the movable contact operated by any suitable device or arrangement which is responsive to changes of the condition to which the speed of the motor is to be adjusted for automatic speed control.

Potentiometer 25 is useful for calibrating the circuitry of FIGURE 1 to produce a selected speed control range but is not absolutely required for proper operation of the unique motor speed control circuitry. It is to be specifically understood that a fixed resistor or fixed resistors may be substituted for potentiometer 25.

The remainder of the circuitry of FIGURE 1 is responsive to the difference potential appearing across movable contacts 26 and 28 of respective potentiometers 25 and 27 for producing a trigger signal at the electrical angle of each potential half cycle of each phase of the alternating current supply potential as determined by the magnitude of the difference in a manner to be explained later in this specification.

That portion of the circuit of FIGURE 1 including transistor 30 having the usual control electrode, base electrode 31, and two current carrying electrodes, collector electrode 32 and emitter electrode 33; unijunction transistor 40 having two base electrodes 41 and 42 and emitter electrode 43; capacitor 34 and base resistors 35 and 36 is a master trigger signal producing circuit which is responsive to the difference potential and the reference potential for producing a first trigger signal at the electrical angle of each potential half cycle of the reference phase of the alternating current supply potential, as determined by the magnitude of the difference potential.

The circuitry within each of dashed rectangles 45 and 46 is a slave trigger signal producing circuit. These circuits are responsive to the first trigger signal for producing successive trigger signals each corresponding to a respective other phase of the alternating current supply potential and spaced from each other by an electrical angle equal to the electrical angle between phases of the alternating current supply potential.

For three phase applications, this trigger signal producing circuitry may be as shown in FIGURE 1. With single and two phase applications, only the master circuit and the master and one slave circuit are required, respectively. With applications involving more than three phases, an additional slave circuit is required for each phase.

The operation of the master and two slave trigger signal producing circuits will be described in detail later in this specification.

The base electrode and one of the current carrying electrodes of the transistor in the master trigger signal producing circuit is connected across the output circuit of the impedance bridge and another source of direct current potential is connected across the series combination of the current carrying electrodes of this transistor and a capacitor.

In FIGURE 1, the base electrode 31 of type PNP transistor 30 is connected to movable contact 28 of control potentiometer 27 through diode 48 and the emitter electrode thereof is connected to movable contact 26 of potentiometer 25 through the variable resistor 50. The emitter electrode 33 of transistor 30 is connected to the positive polarity output terminal of a conventional source of direct current operating potential 19 through variable resistor 50 and the collector electrode 32 thereof is connected to point of ground or reference potential 5 through capacitor 34. This source of direct current operating potential may be conventional in design and is, therefore, shown in the figures in block form in the interest of reducing drawing complexity. Therefore, the emitter-collector electrodes of this type PNP transistor are forward poled by the source of direct current operating potential 19.

Transistor 30 functions as a constant current device which is operated on the flat portion of the collector current versus collector-emitter voltage curve for various values of base current as determined by the difference potential across movable contacts 26 and 28 of respective potentiometers 25 and 27. Therefore, capacitor 34 is charged at a rate determined by the magnitude of the difference potential.

Circuitry responsive to a predetermined charge upon capacitor 34 for establishing a discharge circuit therefor for producing a trigger signal at the electrical angle of each potential cycle of each phase of the alternating current supply potential as determined by the magnitude of the difference potential, is provided.

One example of circuitry suitable for this purpose is the series combination of base resistor 35, base electrodes 41 and 42 of unijunction transistor 40 and base resistor 36 connected across the source of reference potential 20 and the emitter electrode 43 of unijunction transistor 40 connected to a junction 58 between transistor 30 and capacitor 34 operating in combination with the slave trigger producing circuitry contained within dashed rectangles 45 and 46.

The unijunction transistor is a semiconductor device having two base electrodes and an emitter electrode which is characterized by a high emitter to base resistance with an applied emitter potential of a magnitude less than the peak point voltage of the device. With an applied emitter potential of a magnitude equal to or greater than the peak point voltage, the unijunction transistor switches to a low resisance state. After being triggered to conduction, the unijuncion transistor spontaneously extinguishes itself when the potential applied to the emitter electrode is reduced to a magnitude less than the peak point voltage.

When the charge upon capacitor 34, which is applied to emitter electrode 43 of unijunction transistor 40, reaches a magnitude substantially equal to the peak point voltage of the selected unijunction transistor 40, this device switches to its low resistance state and establishes a discharge circuit for capacitor 34 through the emitter electrode 43 and base electrode 42 thereof and base resistor 36. The current flow resulting from the discharge of capacitor 34 produces a trigger signal across resistor 36 which is of a positive polarity at junction 60. As the rate of charge of capacitor 34 is determined by the magnitude of the difference potential across movable contacts 26 and 28 of respective potentiometers 25 and 27 of the bridge circuit, as previously described, the discharge of capacitor 34 through unijunction transistor 40, in response to a predetermined charge thereon, and resistor 36 produces the first trigger signal at the electrical angle of each potential half cycle of the reference phase of the alternating current supply potential, as determined by the magnitude of the difference potential.

The slave trigger signal producing circuitry within dashed rectangle 45 is responsive to the first trigger signal to produce a second trigger signal spaced from the first trigger signal by an electrical angle equal to the electrical angle between phases of the alternating current supply potential and each successive slave trigger signal circuit is responsive to the next preceding trigger signal to produce similarly spaced successive trigger signals.

The circuitry including unijunction transistor 40, transistor 30, capacitor 34, variable resistor 50 and base resistors 35 and 36 may operate as a free running relaxation oscillator circuit. As only one trigger signal is required during each potential half cycle of each phase, it is necessary that provision be made for disenabling this circuit for the remainder of the potential half cycle after the trigger signal has been produced. The anode and cathode electrodes of silicon controlled rectifier 62 are connected to the positive and negative polarity terminals 54 and 55, respectively, of reference potential source 20, therefore, this device is forward poled. The appearance of the trigger signal across resistor 36, which is of a positive polarity at junction 60 as previously described, triggers this device conductive, a condition which substantially removes the interbase potential from unijunction transistor 40 as conducting silicon controlled rectifier 62 is substantially a short circuit across the direct current output terminals 54 and 55 of reference potential source 20 and current limiting fixed resistor 56. Consequently, the master trigger signal producing circuit is disenabled after the production of each trigger signal for the remainder of the potential half cycle. As the reference potential produced by source 20 is a pulsating direct current potential, silicon controlled rectifier 62 is extinguished when the reference potential returns to zero.

With low speed operations, there is a possibility that the difference potential appearing across movable contacts 26 and 28 of respective potentiometers 25 and 27 may not be of a sufficient magnitude to operate the master trigger producing circuitry. To assure that a trigger signal is produced during every potential half cycle of each phase of the alternating current supply potential, the base electrodes 71 and 72 of a second unijunction transistor 70 are connected across base electrodes 41 and 42 of unijunction transistor 40. A resistor 66 and a capacitor 68 are also connected across reference potential source 20 and the emitter electrode 73 of unijunction transistor 70 is connected to a junction 69 between resistor 66 and capacitor 68. The values of resistor 66 and capacitor 68 are selected to have a time constant slightly less than the length of time for one half cycle of the alternating current supply potential. With this arrangement, capacitor 68 will become charged to a magnitude substantially equal to the peak point voltage of unijunction transistor 70 near the end of each potential half cycle of the reference phase. Therefore, unijunction transistor 70 will switch to its low resistance state near the end of each reference phase potential half cycle and provide a discharge path for capacitor 34 through the emitter 73 and base electrode 72 thereof and base resistor 36 to produce an auxiliary trigger signal in the absence of a first trigger signal. This circuit is, of course, inoperative should the first trigger signal be earlier produced as conducting silicon controlled rectifier 62 also removes the interbase potential from unijunction transistor 70.

Connected across the direct current output terminals 54 and 55 of reference potential source 20 is a Zener diode 64.

The Zener diode is a semiconductor device having two current carrying electrodes, generally referred to as the anode and cathode electrodes, which is designed to function as a conventional diode and conduct current in the forward direction when forward poled, anode positive and cathode negative, and to conduct current in the reverse direction while reverse poled, anode negative and cathode positive, when the applied potential exceeds the rated inverse breakdown potential of the device. When conducting in the reverse direction, the potential drop across the Zener diode remains substantially constant with changes in magnitude of current flow.

As the cathode electrode of Zener diode 64 is connected to the positive polarity output terminal 54 of reference potential source 20 through fixed resistor 56 and the anode electrode thereof is connected to the negative polarity output terminal 55 of reference potential source 20 through point of reference or ground potential 5, Zener diode 64 is reverse poled. Therefore, the reference potential appearing across the direct current output terminals 54 and 55 of source of reference potential 20 is clipped by Zener diode 64 and does not exceed a magnitude which is substantially equal to and determined by the rated inverse breakdown potential of the Zener diode selected for this application. Zener diode 64 serves to stabilize the reference potential and also provides a suitable bias potential for unijunction transistors 40 and 70. Therefore, Zener diode 64 should be selected to have an inverse breakdown potential rating of a magnitude compatible with the bias requirements of the unijunction transistor devices selected for this application.

As has been previously brought out, for three phase applications, two slave trigger signal producing circuits are required. With these slave trigger signal producing circuits connected in cascade with the master trigger signal producing circuit and responsive to the trigger signal produced by the next preceding trigger signal producing circuit, successive trigger signals each corresponding to a respective other phase of the alternating current supply potential are produced.

Each one of the slave trigger signal producing circuits may be a conventional monostable multivibrator circuit and are comprised of respective transistor pairs 75 and 76 and 77 and 78 and the included associated circuitry. The collector electrodes of transistors 75, 76, 77 and 78 are connected through respective resistors 79, 80, 81 and 82 to the positive polarity terminal of conventional current operating potential source 19. The potential present upon the positive polarity terminal of direct current operating potential source 19 is of a positive polarity with respect to point of reference potential 5 and of a magnitude compatible with the rated potential of type NPN transistors 75, 76, 77 and 78. The emitter electrodes of these four transistors are connected to point of reference potential 5. Therefore, the emitter-collector electrode circuits of these four type NPN transistors are correctly biased for collector emitter conduction. The collector electrodes of transistors 75 and 77 are also connected to the positive polarity terminal of direct current operating potential source 19 through the series combination of capacitor 84, fixed resistor 85 and potentiometer 86 and through the series combination of capacitor 87, fixed resistor 88 and potentiometer 89, respectively. The base electrodes of transistors 76 and 78 are connected to a junction between capacitor 84 and resistor 85 and a junction between capacitor 87 and resistor 88, respectively. The base electrodes of transistors 75 and 77 are connected to the collector electrodes of transistors 76 and 78, respectively, through respective resistors 90 and 91.

Monostable multivibrator devices are two stage electronic circuits and are characterized by a stable state of operation and an alternate state of operation. These devices may be triggered to the alternate state by a trigger signal and will remain in the alternate state of operation for a period of time as determined by the circuit parameters. At the conclusion of the period of time designed into the circuitry, these devices spontaneously return to the original or stable state of operation.

As the monostable multivibrator circuits of FIGURE 1 comprising transistor pairs 75 and 76 and 77 and 78 are identical in operation, only the operation of transistor pair 75 and 76 and the associated circuitry will be described in detail. As the base electrode of transistor 76 is connected to the junction between capacitor 84 and fixed resistor 85, and the emitter electrode is connected to point of reference potential 5, the potential present upon the base of transistor 76 is positive with respect to the potential present upon the emitter, a condition which satisfies the base-emitter bias requirements, for base-emitter current flow through a type NPN transistor, therefore, transistor 76 is normally conducting.

With transistor 76 conducting and saturated, the potential at junction 95 is substantially ground potential. As the base of transistor 75 is connected to a junction between resistors 90 and 93, which form a voltage divider network between the negative polarity terminal of direct current operating potential source 19 and junction 95, which is substantially ground potential, the potential applied to the base electrode of transistor 75 is of a polarity more negative than that present upon the emitter electrode, a condition which does not satisfy the base-emitter bias requirements for base-emitter current flow through a type NPN transistor, therefore, transistor 75 is normally not conducting. Upon the application of a positive polarity trigger signal to the base electrode of transistor 75 through a conventional diode 96, the base-emitter bias requirements for the conduction of base-emitter current flow through a type NPN transistor is satisfied and transistor 75 may be thereby triggered to conduction. As transistor 75 conducts, capacitor 84 initally appears as a short circuit across the base-emitter electrodes of transistor 76 to extinguish transistor 76 and the monostable multivibrator device is now in its alternate state. With transistor 75 conducting, capacitor 84 begins to charge through a circuit which may be traced from the positive polarity terminal of direct current operating potential source 19 through potentiometer 86, resistor 85 and conducting transistor 75 to point of reference potential 5. After capacitor 84 has become charged to the forward breakdown potential of the base-emitter junction of transistor 76, the potential applied to the base electrode of transistor 76 is of a positive polarity, a condition which satisfies the base-emitter bias requirements for conduction through a type NPN transistor, therefore transistor 76 begins to conduct and the monostable multivibrator device has returned to its original or stable state. From this description, it is apparent that the period of time during which a monostable multivibrator device remains in the alternate state is determined primarily by the time constant of the circuit including capacitor 84, resistor 85 and potentiometer 86 as determined by the setting of the movable contact thereof. Therefor, the period of time during which the monostable multivibrator device will remain in its alternate state may be selected by adjusting the movable contact of potentiometer 86.

As has been previously brought out, one method of varying the speed of an alternating current induction motor is to vary the electrical conduction angle of each potential half cycle of each phase of the alternating current supply potential during which the corresponding phase windings are energized, the greater the electrical conduction angle, the greater the speed of the motor. In the circuit of FIGURE 1, the trigger signals produced thereby are referred to a selected reference phase of the alternating current supply potential and operate trigger signal responsive switching devices to complete and energizing circuit for the phase windings corresponding to the phase of the alternating current supply potential during which the signals are produced. Therefore, to vary the speed of the motor, the trigger signals must be produced at the phase angle of each potential half cycle of each phase of the alternating current potential which will result in a conduction angle over the remainder of each potential half cycle which will produce the selected speed. As the trigger signals produced by the slave trigger signal producing circuitry refer to the trigger signals produced by the master trigger signal trigger producing circuit, this circuit will be initially considered.

Transistor 30 is a type PNP transistor which, when connected as shown in FIGURE 1, is forward poled. To produce emitter-base current flow and, consequently, emitter-collector current flow through a transistor of this type, it is necessary that the potential upon the base electrode be of a polarity which is negative with respect to that present upon the emitter electrode. The base-emitter electrodes of this transistor are connected across the movable contacts 26 and 28 of respective potentiometers 25 and 27, as has previously been described. With movable contacts 26 and 28 adjusted relative to each other to produce zero potential thereacross, transistor 30 is, of course, non-conductive.

An adjustment of movable contact 28 of control potentiometer 27 in a direction toward the negative polarity terminal of direct current potential source 24 results in a potential difference across movable contacts 26 and 28 which is of a negative polarity upon movable contact 28 with respect to that upon movable contact 26. This potential difference is the required difference potential. As this is the proper base-emitter bias for emitter-base current flow through a type PNP transistor and, consequently, emitter-collector conduction, this device begins to conduct through the emitter-collector circuit to establish a charging circuit for capacitor 34 which is connected across the positive polarity terminal of direct current operating potential source 19 and point of reference or ground potential 5 through the emitter-collector electrodes of transistor 30.

As transistor 30 operates as a constant current device, as has previously been described, the rate of charge of capacitor 34 is determined by the magnitude of collector current flow through transistor 30 which is, of course, determined by the magnitude of the difference potential appearing across movable contacts 26 and 28.

When capacitor 34 has become charged to a magnitude substantially equal to the peak point voltage of unijunction transistor 40, this device switches to its low resistance state to establish a discharge circuit for capacitor 34 through emitter electrode 43 and base electrode 42 thereof and base resistor 36. The current flow resulting from the discharge of capacitor 34 produces a trigger signal potential across base resistor 36 which is of a positive polarity at junction 60.

As this trigger signal potential is applied across the gate-cathode electrodes of silicon controlled rectifier 62 and is of the proper polarity to produce gate current through this device, silicon controlled rectifier 62 conducts to provide a current path in parallel with the base electrodes of unijunction transistor 40 to remove the interbase potential therefrom. As the reference potential is a pulsating direct current potential, silicon controlled rectifier 62 remains conductive during the remainder of the half cycle and is extinguished when the pulsating direct current reference potential returns to zero. Consequently, the circuitry including unijunction transistor 40, transistor 30 and capacitor 34 is disenabled for the remainder of each potential half cycle of the reference phase after the trigger signal has been produced and is re-enabled at the end of each potential half cycle.

With a difference potential across movable contacts 26 and 28 of respective potentiometers 25 and 27 of a low magnitude, the magnitude of collector current flow through transistor 30 is low which results in a low rate of charge of capacitor 34. Consequently, a long period of time is required for capacitor 34 to become charged to a magnitude equal to the peak point voltage of unijunction transistor 40 and the trigger signal is produced late during each potential half cycle of the reference phase. The result of the consequent short conduction angle is a low motor speed.

With an adjustment of movable contact 28 in a direction toward the negative polarity terminal of direct current potential source 24, the magnitude of the difference potential across movable contacts 26 and 28 increases. The resulting increase of base and, consequently, collector current flow through transistor 30 increases the charging rate of capacitor 34. Consequently, the period of time required for capacitor 34 to become charged to a magnitude equal to the peak point voltage of unijunction transistor 40 is reduced and the trigger signal is produced earlier during each potential half cycle of the reference phase. The result of the consequent longer conduction angle is an increased motor speed.

From this description, it is apparent that, with the circuitry of FIGURE 1 which employs a type PNP transistor 30, the speed of the motor is increased with an adjustment of movable contact 28 of control potentiometer 27 in a direction toward the negative polarity terminal of potential source 24 and decreased with an adjustment of movable contact 28 in the opposite direction. With a type NPN transistor 30, of course, the speed of the motor would be increased with an adjustment of movable contact 28 of control potentiometer 27 in a direction toward the positive polarity terminal of potential source 24 and decreased with an adjustment of movable contact 28 in the opposite direction.

The adjustment of movable contact 28 of control potentiometer 27 varies the magnitude of the difference potential appearing across movable contacts 26 and 28 by unbalancing this impedance bridge circuit. It is apparent that the same result may be obtained by substituting therefor an electrical impedance bridge circuit having in at least one leg thereof an impedance element which is variable in response to a selected external condition or any other device or arrangement which will produce the required variable difference potential.

As the rate of charge of capacitor 34 is determined by the magnitude of the difference potential across movable contacts 26 and 28 of respective potentiometers 25 and 27, this circuit is responsive to the difference potential for producing a trigger signal across resistor 36 at the phase angle of each potential half cycle of the reference phase of the alternating current supply potential as determined by the magnitude of the difference potential.

With single phase operation, only the master trigger signal producing circuit is required to control the conduction angle over which the phase windings are energized by the alternating current potential source.

For optimum operation at any speed and to provide precise speed control under no load or light load conditions with polyphase supply potential applications, it is necessary that the conduction angle of the potential half cycles of all phases be equal to the conduction angle of the potential half cycles of the phase selected as the reference. With polyphase applications, therefore, it is necessary to provide trigger signal producing circuitry which will produce successive trigger signals each corresponding to a respective phase of the alternating current supply potential and spaced from each other by an electrical angle equal to the electrical angle between phases of the alternating current supply potential.

With three phase applications, for example, the trigger signal produced by the master trigger signal producing circuit and the trigger signal produced by the first slave trigger signal producing circuit compising the monostable multivibrator including transistor pair 75 and 76, previously described, must be spaced by 120 electrical degrees and the trigger signal produced by the second slave trigger signal producing circuit comprising the monostable multivibrator including transistor pair 77 and 78 must be separated from the trigger signal produced by the first slave trigger signal producing circuit by 120 electrical degrees.

The signal produced across resistor 36 by the master trigger signal producing circuitry may be amplified by a conventional transistor amplifier circuit comprising type NPN transistor 71 in FIGURE 1. The collector electrode of transistor 71 is connected to the positive polarity terminal of direct current operating potential source 19 through current limiting resistor 72 and the primary winding 73 of a conventional pulse transformer and the emitter electrode thereof is connected to point of reference potential 5. Therefore, transistor 71 is forward poled and, as the base electrode thereof is returned to point of reference potential 5 through resistors 37 and 36, it is normally not conducting. Upon the appearance of a positive polarity signal across resistor 36, however, the potential upon the base electrode of transistor 71 is of a positive polarity with respect to the emitter electrode, a condition which satisfies the base-emitter bias requirements for base-emitter current flow through a type NPN transistor. Therefore, transistor 71 is biased to conduction by the signal produced across resistor 36. During the period of conduction of transistor 71, a pulse of current, which increases from zero to a value as determined by circuit impedance, flows from the positive polarity terminal of direct current operating potential source 19 through the primary winding 73 of the pulse transformer, current limiting resistor 72 and the collector-emitter electrodes of transistor 71 to point of reference potential 5. The leading edge, or increase from zero, of this current pulse is employed as the trigger signal in this portion of the trigger signal producing circuity.

As current begins to flow through the primary winding 73 of the pulse transformer with each trigger signal, the resulting increasing magnetic field induces a potential in each of secondary windings 97 and 98, magnetically coupled thereto. The potentials induced in secondary winding 98 may be applied across the control-cathode electrodes of silicon controlled rectifier switch 10, FIGURE 2, through terminals 100(1) and 101(1) of FIGURE 1 and 100(2) and 101(2) of FIGURE 2, respectively, and the potentials induced in secondary winding 97 are applied across the base-emitter electrodes of transistor 75 through lead 102 and diode 96 and point of reference potential 5, respectively. Secondary winding 98 is so poled that the end connected to terminal 100(1) is of a positive polarity with an increase of current flow through the primary winding 73 of the pulse transformer, therefore, silicon controlled rectifier 10 will be triggered to conduction by this trigger signal with a proper polarity potential appearing across phase windings A and B. Secondary winding 97 is so poled that the end connected to lead 102 is of a positive polarity potential with an increase in current flow through the primary winding 73 of the pulse transformer, therefore, transistor 75 is triggered to conduction by this trigger signal.

As transistor 75 is triggered to conduction, transistor 76 is triggered to nonconduction, in a manner previously described, and this monostable multivibrator circuit is in the alternate state of operation. As transistor 76 goes nonconductive, a signal appears across transistor 76 which is of a positive polarity at junction 95.

The signal produced across transistor 76 may be amplified by a conventional transistor amplifier circuit including type NPN transistor 104, the collector-emitter electrodes of which are connected across positive polarity terminal of direct current operating potential source 19 and point of reference potential 5 and, therefore, are forward poled.

The positive polarity potential appearing at junction 95 and applied to the base electrode of transistor 104 is of the proper polarity to produce base-emitter current flow through a type NPN transistor, therefore, transistor 104 is triggered to conduction.

After a time duration as determined by the values of the circuit components in the timing circuit of the monostable multivibrator including transistors 75 and 76, previously described, transistor 75 spontaneously returns to the nonconductive state and transistor 76 goes conductive, removing the potential from junction 95 and extinguishing transistor 104.

During the period of conduction of transistor 104, a pulse of current, which increases from zero to a value as determined by circuit impedance, flows from the positive potential terminal of direct current operating potential source 19, through primary winding 106 of a pulse transformer, current limiting resistor 105 and the collector-emitter electrodes of transistor 104 to point of reference potential 5 and returns to zero as transistor 104 is extinguished. The trailing edge of this current pulse as it returns to zero is employed as the trigger signals in this portion of the trigger signal producing circuitry.

As current ceases to flow through primary winding 106 of the pulse transformer with each of these trigger signals, the resulting collapsing magnetic field induces a potential in each of the magnetically coupled secondary windings 107 and 108. Secondary winding 107 is so poled that the potential induced therein by the collapsing magnetic field is of a positive polarity at the end connected to lead 112 and secondary winding 108 is so poled that the potential induced therein by the collapsing magnetic field is of a positive polarity at the end connected to terminal 115(1).

The potentials induced in secondary winding 107 are applied across the base-emitter electrodes of transistor 77 through lead 112 and diode 114 and point of reference potential 5, respectively. As the potential induced in secondary winding 107 by the collapsing magnetic field of the primary winding 106 is of a positive polarity at the end connected to lead 112, the proper potential polarity relationship is established across the base-emitter electrodes of transistor 77 to produce base-emitter current flow through a type NPN transistor, therefore, this device is triggered to conduction by this trigger signal. The potentials induced in secondary winding 108 may be applied across the control-cathode electrodes of silicon controlled rectifier 11, FIGURE 2, through terminals 115(1) and 116(1) of FIGURE 1 and 115(2) and 116(2) of FIGURE 2, respectively. As the potential induced in secondary winding 108 by the collapsing magnetic field of the primary winding is of a positive polarity at the end connected to terminal 115(1), the proper potential polarity relationship is established across the control-cathode electrodes of silicon controlled rectifier 11, FIGURE 2, to produce gate current through a silicon controlled rectifier, therefore, this device will be triggered to conduction by this trigger signal with a proper polarity potential appearing across phase windings B and C.

As transistor 77 is triggered to conduction, transistor 78 is triggered to nonconduction, in a manner previously described, and this monostable multivibrator circuit is in the alternate state of operation. As transistor 78 goes nonconductive, a signal appears across transistor 78 which is of a positive polarity at junction 120.

The signal produced across transistor 78 may be amplified by a conventional transistor amplifier circuit including type NPN transistor 124, the collector-emitter electrodes of which are connected across positive polarity terminal of direct current operating potential source 19 and point of reference potential 5 and, therefore, are forward poled.

The positive polarity potential appearing at junction 120 and applied to the base electrode of transistor 124 is of the proper polarity to produce base-emitter current flow through a type NPN transistor, therefore, this device is triggered to conduction.

After a time duration as determined by the values of the circuit components in the timing circuit of the monostable multivibrator including transistors 77 and 78, previously described, transistor 78 spontaneously returns to the nonconductive state and transistor 78 goes conductive, removing the potential from junction 120 and extinguishing transistor 124.

During the period of conduction of transistor 124, a pulse of current, which increases from zero to a value as determined by circuit impedance, flows from the positive potential terminal of direct current operating potential source 19 through the primary winding 126 of a pulse transformer, current limiting resistor 128 and the collector-emitter electrodes of transistor 124 to point of reference potential 5 and returns to zero as transistor 124 is extinguished. The trailing edge of this current pulse as it returns to zero is employed as the trigger signal in this portion of the trigger signal producing circuitry.

As current ceases to flow through primary winding 126 of the pulse transformer with each of these trigger signals, the resulting collapsing magnet field induces a potential in magnetically coupled secondary winding 130. Secondary winding 130 is so poled that the potential induced therein by the collapsing magnetic field is of a positive polarity at the end connected to terminal 135(1).

The potentials induced in secondary winding 130 are applied across the control-cathode electrodes of silicon controlled rectifier 12, FIGURE 2, through terminals 135(1) and 136(1) of FIGURE 1 and 135(2) and 136(2) of FIGURE 2, respectively. As the potential induced in secondary winding 130 by the collapsing magnetic field of the primary winding is of a positive polarity at the end connected to terminal 135(1), the proper potential polarity relationship is established across the control-cathode electrodes of silicon controlled rectifier 12 to produce gate current flow through a silicon controlled rectifier, therefore, this device will be triggered to conduction by this trigger signal with proper polarity potential appearing across phase windings A and C.

The potentials induced in secondary windings 97 and 98 by the collapsing magnetic field of primary winding 73, in secondary windings 107 and 108 and in secondary winding 130 with the increasing magnetic field of respective primary windings 106 and 126 are of the incorrect polarity and therefore, are rejected by and do not affect the operation of this circuit.

Briefly reviewing the operation of the trigger signal producing circuitry just described, the trigger signal produced by the master signal producing circuit is applied across the gate-cathode electrodes of silicon controlled rectifier 10 and triggers the monostable multivibrator circuit including transistors 75 and 76 to the alternate state. The trigger signal produced by this monostable multivibrator circuit as it returns to the stable state of operation is applied to the gate-cathode electrodes of silicon controlled rectifier 11 and triggers the monostable multivibrator circuit including transistors 77 and 78 to the alternate state. The trigger signal produced by this monostable multivibrator circuit as it returns to the stable state of operation is applied across the gate-cathode electrodes of silicon controlled rectifier 12.

The period of time between the trigger signals produced by the master trigger signal producing circuitry and the first slave trigger signal producing circuitry and between the trigger signals produced by the first slave trigger signal producing circuit and the second slave trigger signal producing circuit may be selected to correspond to the electrical angle which is equal to the electrical angle between phases of the alternating current supply potential by adjusting respective potentiometers 86 and 89 of the timing circuit in the respective monostable multivibrator circuits. For example, with three phase, sixty trigger signals should be 5.55 milliseconds, a period of time which corresponds to 120 electrical degrees at sixty cycles per second.

It is to be specifically understood that this invention is not limited to the precise trigger signal producing circuitry as hereinabove described as alternate methods for producing these spaced trigger signals may be employed without departing from the spirit of the invention. For example, the multivibrator circuits of both the first and second slave trigger signal producing circuits may be triggered to the alternate state by the trigger signal produced by the master trigger signal producing circuit. With this alternative, potentiometer 86 may be adjusted to produce a time duration which corresponds to the electrical angle between phases of the alternating current supply potential and potentiometer 89 may be adjusted to produce a time duration corresponding to twice the electrical angle between phases of the alternating current supply potential.

The circuitry of FIGURE 1 may also be used with a delta connected induction motor as shown in FIGURE 3 of the drawings. To connect the configuration of FIGURE 3 into the circuitry of FIGURE 1, coils 140 and 141, FIGURE 3, are magnetically coupled to the primary winding 73, FIGURE 1, in place of primary winding 98, coils 150 and 151, FIGURE 3, are magnetically coupled to primary winding 106, FIGURE 1, in place of secondary winding 108 and coils 160 and 161, FIGURE 3, are magnetically coupled to primary winding 126, FIGURE 1, in place of secondary winding 130. The coils of FIGURE 3 are, of course, so poled to produce the correct potential polarity relationship across the gate-cathode electrodes of each respective silicon controlled rectifier. Although trigger signals are applied simultaneously to both silicon controlled rectifiers of each phase during each potential cycle of each phase of the alternating current supply potential, only those silicon controlled rectifiers which are forward poled will be triggered conductive by any one trigger signal. Consequently, both silicon controlled rectifiers of each oppositely poled parallel pair will never be triggered conductive simultaneously.

From this description, it is apparent that the novel speed control system of this invention operates equally well with either Y or delta connected alternating current induction motors and that the motor phase windings are energized over the same electrical conduction angle of each phase for any magnitude of difference potential. That is, the motor windings are cyclically energized by the novel speed control system of this invention as opposed to power on-off speed control systems in which polyphase energizing potential is applied to the motor in "slugs" to power without regard to the conduction angle of the respective phases.

It is to be specifically understood that any device, element or component which will produce a condition of unbalance of the impedance bridge circuit in response to temperature, pressure, light intensity, potential, current, torque or any other physical quantity which may be translated by appropriate circuit techniques may be used in the impedance bridge circuit or any mechanical device so responsive to operate a variable impedance may be employed without departing from the spirit of this invention.

Throughout this specification, specific electronic circuitry, components, gating arrangements and electrical polarities have been set forth. It is to be specifically understood that other electrical circuitry, components and gating arrangements having similar electrical characteristics and compatible electrical polarities may be substituted therefor.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A speed control system for alternating current electric motors of the type having discrete phase windings corresponding to each phase of a compatible alternating current supply potential comprising, respective controllable switching circuit means responsive to electrical trigger signals for establishing an energizing circuit for each said phase winding across the corresponding said phase of said alternating current supply potential, means for producing a reference potential in synchronism with a selected reference phase of said supply potential, a separate source of direct current potential, an electrical impedance bridge circuit having input and output circuit means and including in at least one leg thereof an impedance element which is variable in response to changes of an external condition to which the speed of the motor is to be adjusted for producing a difference potential across said output circuit means thereof, means for connecting said impedance bridge input circuit means across said separate source of direct current potential, means responsive to said difference potential and said reference potential for producing a first trigger signal at the electrical angle of each potential half cycle of the said reference phase of said alternating current supply potential as determined by the magnitude of said difference potential, means responsive to said first trigger signal for producing successive trigger signals each corresponding to a respective other phase of said supply potential and spaced from each other by an electrical angle equal to the electrical angle between phases of said alternating current supply potential and means for applying said trigger signals to respective said controllable switching circuit means.

2. A speed control system for alternating current electric motors of the type having discrete phase windings corresponding to each phase of a compatible alternating current supply potential comprising, respective controllable switching circuit means responsive to electrical trigger signals for establishing an energizing circuit for each said phase-winding across the corresponding said phase of said alternating current supply potential, means for producing a reference potential in synchronism with a selected reference phase of said supply potential, a separate source of direct current potential, an electrical impedance bridge circuit having input and output circuit means and including in at least one leg thereof an impedance element which is variable in response to changes of an external condition to which the speed of the motor is to be adjusted for producing a difference potential across said output circuit means thereof, means for connecting said impedance bridge input circuit means across said separate source of direct current potential, a source of direct current operating potential, a transistor having a base and two current carrying electrodes, means for connecting said base electrode and one of said current carrying electrodes of said transistor across said impedance bridge output circuit means, a capacitor, means for connecting said direct current operating potential across the series combination of said current carrying electrodes of said transistor and said capacitor whereby said capacitor is charged at a rate determined by the magnitude of said difference potential, means responsive to a predetermined charge upon said capacitor for establishing a discharge circuit for said capacitor for producing a trigger signal at the electrical angle of each potential half cycle of each phase of said alternating current supply potential as determined by the magnitude of said difference potential and means for applying said trigger signals to respective said controllable switching circuit means.

3. A speed control system for alternating current electric motors of the type having discrete phase windings corresponding to each phase of a compatible alternating current supply potential comprising, respective controllable switching circuit means responsive to electrical trigger signals for establishing an energizing circuit for each said phase-winding across the corresponding said phase of said alternating current supply potential, a source of reference potential synchronized with a selected reference phase of said alternating current supply potential, a separate source of direct current potential, an electrical impedance bridge circuit having input and output circuit means and at least one impedance element which is variable in response to an external force, means for connecting said impedance bridge input circuit means across said separate source of direct current potential, a source of direct current operating potential, a transistor having a base and two current carrying electrodes, means for connecting said base electrode and one of said current carrying electrodes of said transistor across said impedance bridge output circuit means, a capacitor, means for connecting said current carrying electrodes of said transistor and said capacitor in series across said source of direct current operating potential whereby said capacitor is charged at a rate determined by the magnitude of the potential difference across said impedance bridge output circuit means, means responsive to a predetermined charge upon said capacitor for establishing a discharge circuit for said capacitor for producing a trigger signal at the electrical angle of each potential half cycle of each phase of said alternating current supply potential as determined by the magnitude of the difference of potential across said impedance bridge output circuit means and means for applying said trigger signals to respective said controllable switching circuit means.

4. A speed control system for alternating current electric motors of the type having discrete phase windings corresponding to each phase of a compatible alternating current supply potential comprising, a respective controllable switching circuit means responsive to electrical trigger signals for establishing an energizing circuit for each said phase-winding across the corresponding said phase of said alternating current supply potential, means for rectifying a selected phase of said supply potential for providing a reference potential source in synchronism with said selected reference phase, a separate source of direct current potential, a potentiometer having a movable contact, a control potentiometer having a movable contact which is adapted to be operated by changes of an external condition to which the speed of the motor is to be adjusted, means for connecting said potentiometers across said separate source of direct current potential in parallel, a source of direct current operating potential, a transistor having a base and two current carrying electrodes, a capacitor, first and second resistors, means for connecting said base electrode and one of said current carrying electrodes of said transistor across said movable contacts of said potentiometers, means for connecting said current carrying electrodes of said transistor and said capacitor in series across said source of direct current operating potential whereby said capacitor is charged at a rate determined by the magnitude of the potential difference across said movable contacts of said potentiometers, a unijunction transistor having two base electrodes and an emitter electrode for establishing a discharge circuit for said capacitor, means for connecting said first resistor, said base electrodes of said unijunction transistor and said second resistor in series across said reference potential source, means for connecting said emitter electrode of said unijunction transistor to a junction between said transistor and said capacitor whereby said unijunction transistor is responsive to a predetermined charge upon said capacitor to establish a discharge circuit for said capacitor through said second resistor to produce a first trigger signal across said second resistor at the electrical angle of each potential half cycle of said reference phase of said alternating current supply potential as determined by the magnitude of the difference of potential across said movable contacts of said potentiometers, means responsive to said first trigger signal for producing successive trigger signals each corresponding to a respective phase of said alternating current supply potential and spaced from each other by an electrical angle equal to the electrical angle between phases of said alternating current supply potential and means for applying said trigger signals to respective said controllable switching circuit means.

5. A speed control system for alternating current electric motors of the type having discrete phase windings corresponding to each phase of a compatible alternating current supply potential comprising, respective controllable switching circuit means responsive to electrical trigger signals for establishing an energizing circuit for each said phase-winding across the corresponding said phase of said alternating current supply potential, means for rectifying a selected phase of said supply potential for providing a reference potential source in synchronism with said selected reference phase, a separate source of direct current potential, a first potentiometer having a movable contact, a second potentiometer having a movable contact which is adapted to be operated by changes of an external condition to which the speed of the motor is to be adjusted, means for connecting said first and second potentiometers across said separate source of direct current potential in parallel, a source of direct current operating potential, a transistor having a base and two current carrying electrodes, first and second capacitors, first, second and third resistors, means for connecting said base electrode and one of said current carrying electrodes of said transistor across said movable contacts of said potentiometers, means for connecting said current carrying electrodes of said transistor and said first capacitor in series across said source of direct current operating potential whereby said capacitor is charged at a rate determined by the magnitude of the potential difference across said movable contacts of said potentiometers, means for connecting said first resistor and said second capacitor in series across said reference potential source, first and second unijunction transistor each having two base electrodes and an emitter electrode for establishing respective discharge circuits for said first and second capacitors, means for connecting said second resistor, said base electrodes of said first unijunction transistor and said third resistor in series across said reference potential source, means for connecting said emitter electrode of said first unijunction transistor to a junction between said transistor and said first capacitor whereby said first unijunction transistor is responsive to a predetermined charge upon said first capacitor to establish a discharge circuit for said first capacitor through said emitter electrode and one base electrode thereof and said third resistor to produce a first trigger signal across said third resistor at the electrical angle of each potential half cycle of said reference phase of said alternating current supply potential as determined by the magnitude of the difference of potential across said movable contacts of said first and second potentiometers, means for connecting said base electrodes of said second unijunction transistor across said base electrodes of said first unijunction transistor, means for connecting said emitter electrode of said second unijunction transistor to a junction between said first resistor and said second capacitor whereby said second unijunction transistor is responsive to a predetermined charge upon said second capacitor to establish a discharge circuit for said second capacitor through said emitter electrode and one base electrode thereof and said third resistor to produce an auxiliary trigger signal across said third resistor in the absence of a first said trigger signal, means responsive to a trigger signal appearing across said third resistor for producing successive trigger signals each corresponding to a respective phase of said alternating current supply potential and spaced from each other by an electrical angle equal to the electrical angle between phases of said alternating current supply potential and means for applying said trigger signals to respective said controllable switching circuit means.

References Cited

UNITED STATES PATENTS 3,387,196   6/1968   Graham et al. _______ 318—227

ORIS L. RADER, Primary Examiner

G. RUBINSON, Assistant Examiner

U.S. Cl. X.R.

318—230

PO-1050
(5/69)

UNITED STATES PATENT OFFICE
CERTIFICATE OF CORRECTION

Patent No. 3,506,899          Dated April 14, 1970

Inventor(s) Donald E. Graham

It is certified that error appears in the above-identified patent and that said Letters Patent are hereby corrected as shown below:

Column 2, line 57, "folowing" should read -- following --. Column 4, line 14, "variad" should read -- varied --. Column 6, line 12, "resisance" should read -- resistance --. Column 7, line 74, before "current" insert -- direct --. Column 8, line 62, "initally" should read -- initially --. Column 9, line 9, "therefor" should read -- therefore --. Column 11, line 21, "compising" should read -- comprising --. Column 14, line 20, after "sixty" insert -- cycle applications the time duration between these --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents